(12) United States Patent
West

(10) Patent No.: US 7,046,527 B2
(45) Date of Patent: May 16, 2006

(54) POWER CONVERTER WITH RIPPLE CURRENT CANCELLATION USING SKEWED SWITCHING TECHNIQUES

(75) Inventor: Richard T. West, Pismo Beach, CA (US)

(73) Assignee: Distributed Power, Inc., San Luis Obispo, CA (US)

( * ) Notice: Subject to any disclaimer, the term of this patent is extended or adjusted under 35 U.S.C. 154(b) by 0 days.

(21) Appl. No.: 10/249,814

(22) Filed: May 9, 2003

(65) Prior Publication Data
US 2004/0223348 A1    Nov. 11, 2004

(51) Int. Cl.
*H02M 1/12*    (2006.01)

(52) U.S. Cl. .......................................... 363/41; 363/71

(58) Field of Classification Search ............ 363/39–41, 363/65, 67, 69, 71, 97, 98, 131, 132, 137; 323/272
See application file for complete search history.

(56) References Cited

U.S. PATENT DOCUMENTS

| | | | | |
|---|---|---|---|---|
| 5,460,244 A | * | 10/1995 | Tanahashi | 187/293 |
| 5,657,217 A | * | 8/1997 | Watanabe et al. | 363/71 |
| 6,392,905 B1 | * | 5/2002 | Huang et al. | 363/71 |
| 6,510,063 B1 | * | 1/2003 | Kobayashi et al. | 363/41 |
| 6,545,450 B1 | * | 4/2003 | Ledenev et al. | 323/272 |
| 6,593,724 B1 | * | 7/2003 | Chen | 323/283 |

* cited by examiner

*Primary Examiner*—Gary L Laxton

(57) ABSTRACT

The invention is an electrical power converter using multiple, high frequency switching elements where the individual switching elements are operated in a synchronous, time-skewed arrangement to provide optimum ripple current cancellation.

2 Claims, 3 Drawing Sheets

POWER CONVERTER WITH RIPPLE CURRENT CANCELLATION USING SKEWED SWITCHING TECHNIQUES

BACKGROUND OF THE INVENTION

Inverters for high power Distributed Energy (DE) systems currently use technology that is basically borrowed from the industrial motor drive, motive power and Uninterruptible Power Supply (UPS) industries. This adapted technology falls short of meeting critical requirements for commercially viable distributed energy systems.

Prior art DE inverters utilize power magnetic components that are physically large and heavy to allow the inverter to work at high conversion efficiencies. Basically, the larger the magnetic components, the lower the semiconductor switching frequency, the lower the semiconductor switching losses, the higher the conversion efficiency. The finished size, weight and cost of the inverter are largely driven by the magnetic filter components. The inverter conversion efficiency, however, is not a performance parameter that can be traded off for smaller magnetic components because the cost of the "green" energy, from a photovoltaic array, fuel cell or wind turbine is of such high value. For a given system output, any losses in the DE inverter must be made up in additional generating capacity in the DE source.

In all power conversion equipment, using high frequency switching topologies, the higher the switching frequency, the smaller the magnetic components will be. The weight and size of magnetic components typically account for over 50% of the system weight and over 30% of the system size. These magnetic components are usually made from two materials, copper and iron. The semiconductor power switch module, another key power component, can become highly integrated and all of the system control can be put on one thumbnail sized microcontroller but the magnetics will still determine the equipment size and weight.

In DE inverters with power ratings greater than 10 kW, typically the switching and diode recovery losses of the IGBT power switches limit the maximum switching frequency, for a given conversion efficiency. These losses, at a given operating point, are the same for every switch cycle so that a machine running at 16 kHz will have twice the losses of the same machine running at 8 kHz. The trade-off is that for an equivalent amount of filtering, the 8 kHz operation would require twice the filter inductance.

BRIEF SUMMARY OF THE INVENTION

The invention is an electrical power converter using multiple, high frequency switching elements where the individual switching elements are operated in a synchronous, typically fixed-frequency, time-skewed arrangement to provide optimum ripple current cancellation. By skewing the switching times on paralleled power bridges, the cost, weight and volume of inductive and capacitive filter components are substantially reduced. The performance advantages increase with the number of power bridges used.

The invention also supports inverter system designs that use modular bridge assemblies. Product reliability is enhanced and engineering development costs are reduced when a wide range of inverter products can all be built with different combinations of the same, lower power, modular, functional block.

The primary benefit of this invention is the accelerated maturation and commercialization of distributed energy systems. These systems include renewable generator sources such as photovoltaics, wind turbines and micro-hydro, quasi-renewable sources such as fuel cells, micro-turbine and advanced batteries as well as traditional generators such as gensets and lead-acid batteries. Specific applications include green power generation, grid support and peak shaving.

DETAILED DESCRIPTION OF THE INVENTION

The following discussion illustrates the preferred embodiment of the invention. FIG. 1 shows two typical, three-phase bridge circuits, 1 and 2, connected to a common DC source, 6. The high frequency switching elements 11–16 and 21–26 are typically Insulated Gate Bipolar Transistors (IGBTs) with anti-parallel diodes. Bridges 1 and 2 are operated to convert DC power to three-phase AC current delivered to AC utility lines A, B and C. Inductors 17–19 and 27–29 filter the PWM switching waveforms from the two bridges. Capacitors 54–56 provide a second filter pole and operate in conjunction with filter inductors 17–19 and 27–29. The common points A, B and C of capacitors 54–56 are the summing nodes for the individual inductor currents. 51, 52 and 53, for this discussion, are the "primary" windings of a distribution transformer where the "secondary" is connected to the utility grid.

In this application, a prior art control circuit commands switches 11–16 and 21–26 in each bridge to regulate sinusoidal current into the utility grid synchronized with the utility voltage. This regulation methodology is known.

The two-bridge topology illustrated in FIG. 1 is known, though atypical. If the switching elements of bridge 1 and bridge 2 are operated in unison, as in prior art, current regulating, utility grid interactive power converters, there is no cost or performance advantage to using two bridges verses one bridge at twice the power. By using separate current regulator circuits for bridges 1 and 2, and by skewing the Pulse Width Modulation (PWM) current regulator high frequency switching times by 180°, in bridge 2, relative to bridge 1, substantial ripple current cancellation and ripple current frequency multiplication are achieved.

FIG. 2 illustrates the benefits of this method and further describes the operation of one of the three phases illustrated in FIG. 1. In a typical utility interactive inverter, high frequency ripple current, typically 4 kHz to 20 kHz is superimposed on the 60 Hz sine wave current. FIG. 2 illustrates two idealized scenarios showing only the high frequency ripple current components. FIG. 1 will be referred to extensively in the descriptions of FIG. 2.

FIG. 2 shows PWM voltage waveforms VA1 and VA2. VA1 is the voltage at the common point of switches 11 and 12 in FIG. 1. VA2 is the voltage at the common point of switches 21 and 22 in FIG. 1. IA1 and IA2 are the currents through inductors 17 and 27 in FIG. 1, respectively. FIG. 2A shows the intended operation of the invention with VA1 and VA2 skewed by 180 degrees at the switching frequency of bridges 1 and 2. FIG. 2B shows the prior art method of where bridges 1 and 2 in FIG. 1 are switched at the same time. The resultant ripple current drawn from DC bus capacitor 7, in FIG. 1 and the residual switching frequency current component delivered to the utility line, IA, is the algebraic sum of bridge currents IA1 and IA2 for a given phase. The composite or summed ripple current, IA in FIG. 2A, is reduced in amplitude by over 50% and the frequency is multiplied by a factor of two, compared with the two bridges operating in tandem in FIG. 2B. Assuming the other two phases are working with the same skewed PWM arrangement, for the same net ripple current into AC lines A, B and C, the filter inductors 17–19 and 27–29, can theoretically be reduced by a factor of four. The ripple current requirements for filter capacitors 54–56 and capacitor 7 across the DC bus can also reduced by more than half.

One regulation methodology that facilitates the skewed bridge operation is to compare current feedback to a precision sinusoidal current reference and generate an error signal. This error signal is then compared to a triangle waveform to produce a PWM pulse train. The PWM pulse train drives the bridge power switches creating a given phase current. The circuit operates as a servo-loop, forcing the respective phase current to replicate the sinusoidal current reference. This regulation method is well known.

To operate the two bridges shown in FIG. 1 with the intended time-skewed PWM pulse trains, six of these current regulators are required. The skewing is accomplished by delaying the triangle waveform used for regulating bridge 2 currents with respect to the triangle waveform used to for regulating bridge 1 currents by 180° at the switching frequency. This is only one regulation method and is used to best illustrate the implementation of the skewed bridge control. More appropriate regulation methods for new products would be had using Digital Signal Processor(s) to perform the skewed PWM regulation under firmware control.

FIG. 3 is intended to further illustrate the benefits of operating with skewed bridges as more bridges are added. FIG. 3 illustrates two idealized scenarios showing only the high frequency ripple current components. FIG. 3 shows the PWM voltage waveforms and current waveforms of one of the three power converter phases shown in FIG. 1, where instead of the two bridges, four bridges are used. FIG. 3B shows a prior art converter running with four power switches of the same phase on four different bridges switching on and off at the same time. FIG. 3A shows, a preferred embodiment of the invention with skewed bridges running with the PWM signals on each of the four bridges out of phase with the next by 90°, at the switching frequency. There are two desirable effects that are had from the skewed PWM method, the ripple amplitude is reduced by 83%, at this particular pulse width, and the residual high frequency current component is quadrupled in frequency.

If the prior art converter operated according to FIG. 3B were run asynchronous, there would be some random ripple current cancellation according to probability theory. The ripple current would appear modulated with an envelope having peak amplitudes equal to that of the synchronous, coincidental, prior art converter and with an envelope trough amplitude equal to that of the skewed bridge converter.

By using the skewed bridge method with multiple bridges, the effective switching frequency of the power converter, as seen by the primary filter components, is multiplied by the number of paralleled bridges.

The basis of this invention is a utility-grid-interactive, current regulating, multiple bridge, power converter apparatus operating with time-skewed high frequency PWM timing to reduce the amount of high frequency current sourced into the electric utility grid.

Figure 1:
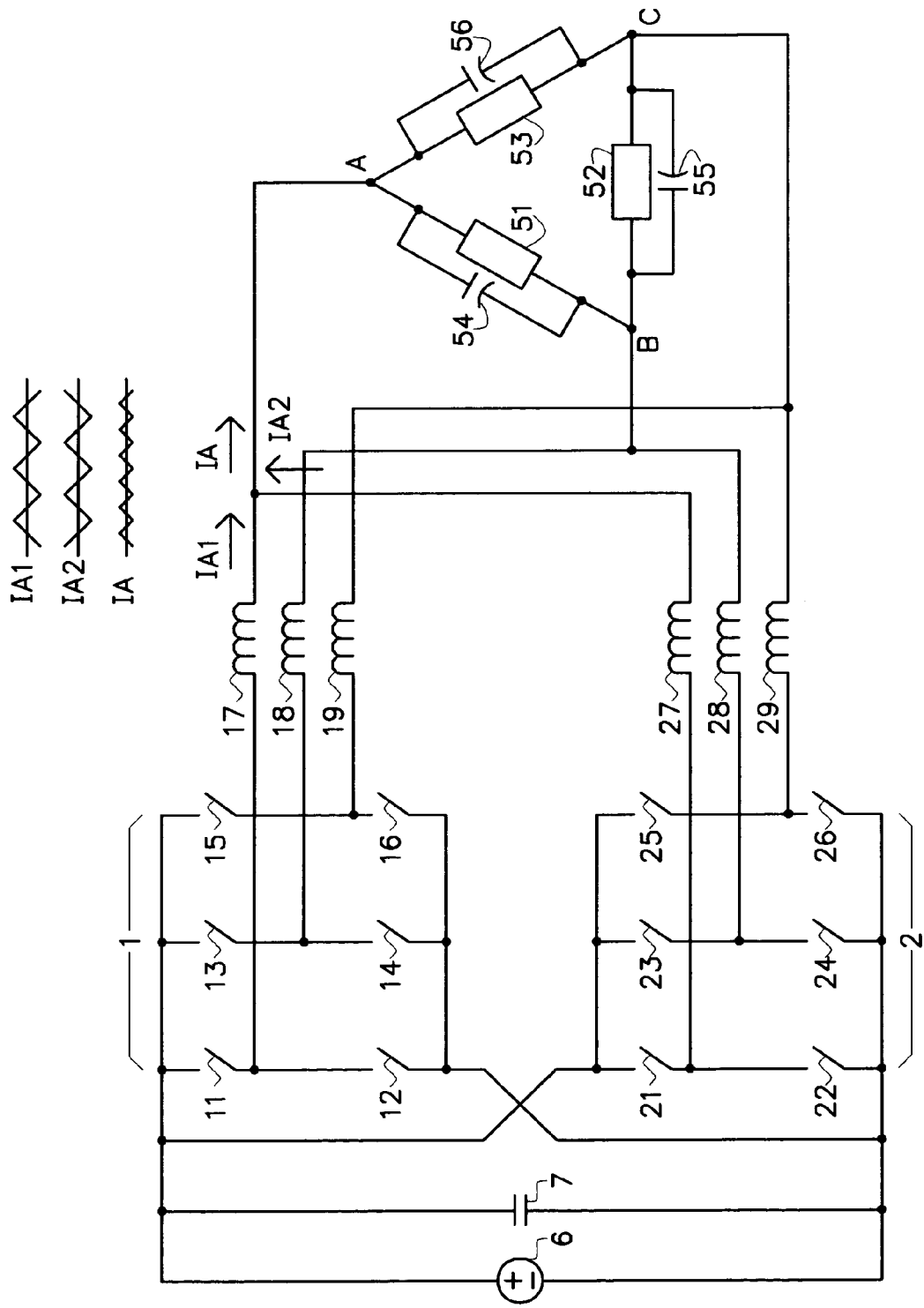
FIG. 1 illustrates the preferred embodiment of the invention where two, high frequency, three-phase skewed bridge circuits are use to convert DC power to AC power in a utility interactive inverter.
Figure 2A:
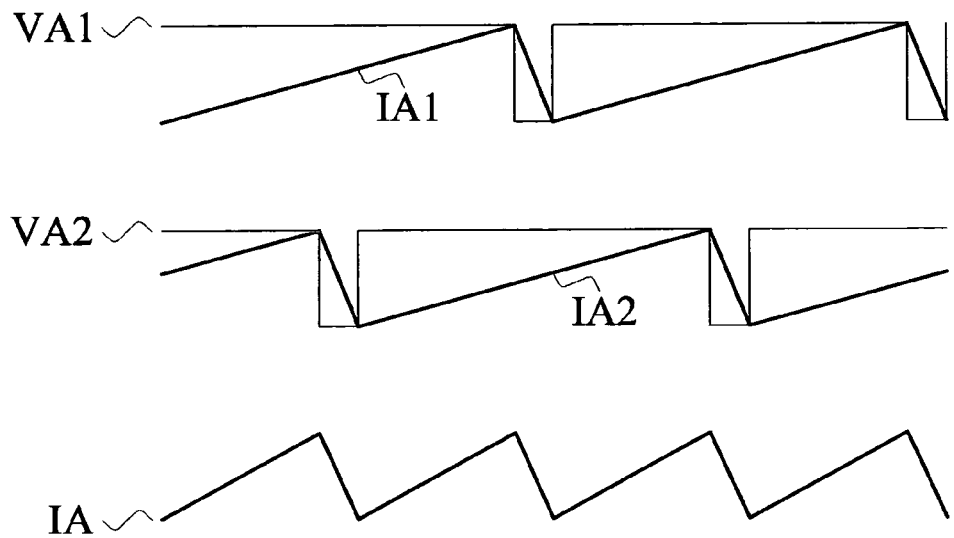
FIG. 2 illustrates the ripple current reduction by cancellation and ripple current frequency multiplication had by skewing the two bridges shown in FIG. 1.
Figure 2B:
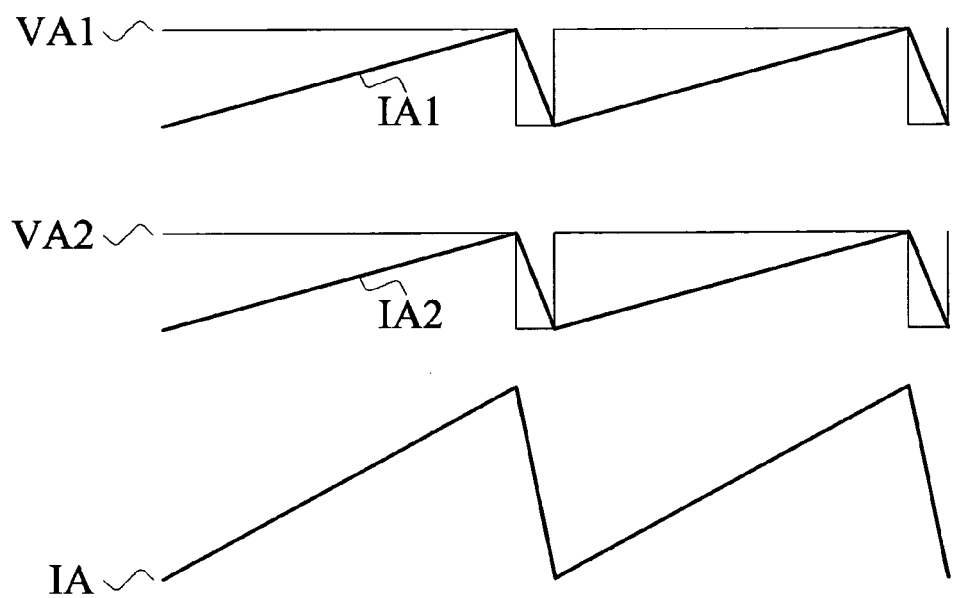
Figure 3A:
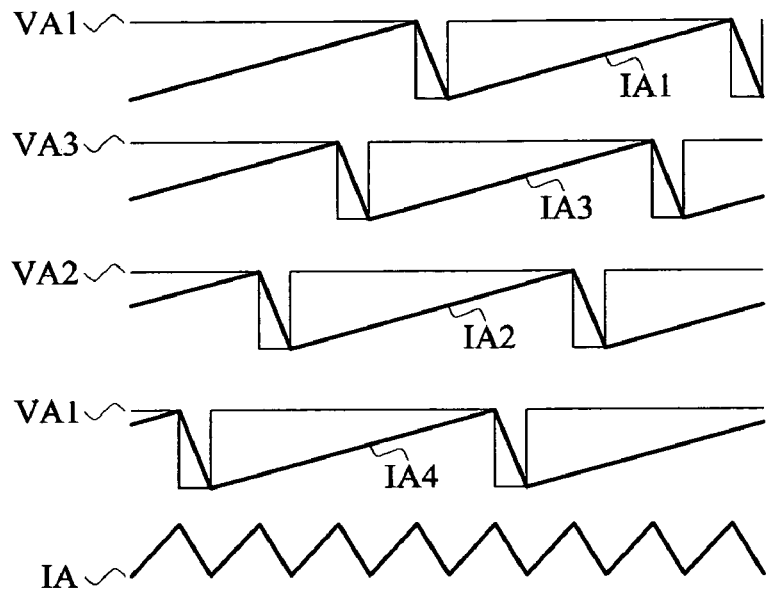
FIG. 3 illustrates the ripple current reduction by cancellation and ripple current frequency multiplication had by skewing four bridges.
Figure 3B:
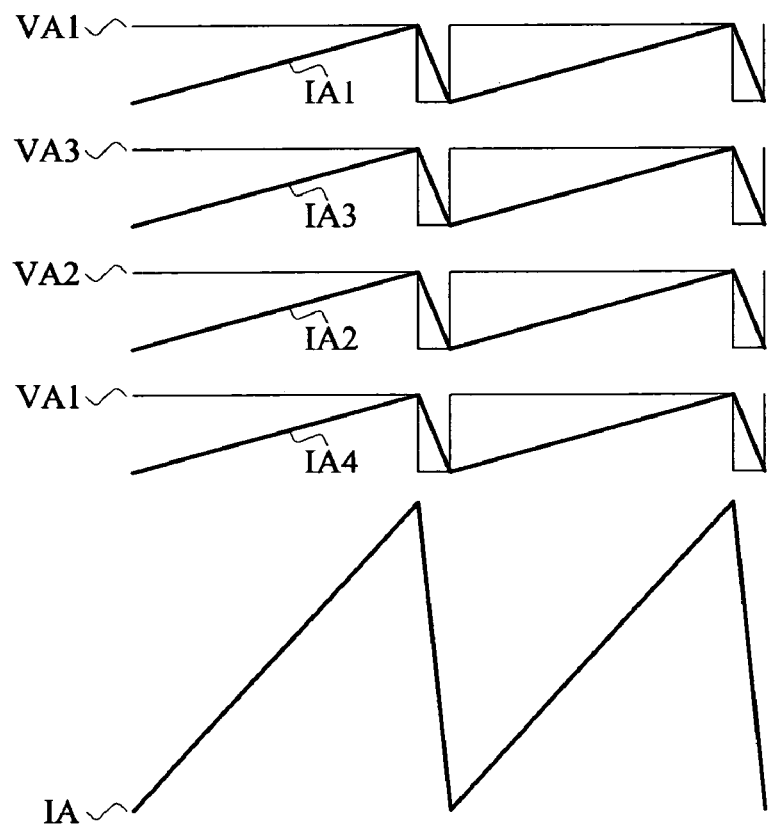

The invention claimed is:

1. An electrical, utility-grid-interactive, power processing apparatus that sinks current from a direct current power source and sources current into an electric utility grid and comprises two or more high frequency, pulse modulated, current regulating power converter sections for each distinct phase of an electric utility grid and where each said power converter section comprises an arrangement of semiconductor power switching devices and a filter inductor and where currents in the filter inductors of said power converter sections dedicated to the same phase are summed or combined and where said high frequency, pulse modulated current regulation for each said power converter section is shifted in time or phase delayed with respect to the remaining power converter section or sections, dedicated to the same phase, for the purpose of reducing the amplitude of high-frequency pulse modulation ripple current being sourced into the electrical utility grid.

2. An apparatus according to claim 1 where a regulation methodology is used for each converter section where a value of current thru each said power converter section filter inductor is compared to a sinusoidal current reference to generate an error signal that is in turn compared to a triangle waveform to produce a high frequency pulse train that is in turn used to drive said arrangement of semiconductor power switches to generate a given phase current, thereby forcing the given phase current to replicate the sinusoidal current reference and where each said triangle waveform, and in turn each said high frequency pulse train, is skewed or phase delayed with respect to the remaining power converter sections on a common utility grid phase.

* * * * *